Nov. 16, 1937.   C. L. SEWARD, JR   2,099,375
ANTIVIBRATION SUPPORT FOR INSTRUMENTS
Filed May 7, 1935   3 Sheets—Sheet 1

INVENTOR.
Clarence Lee Seward, Jr.
BY
Stephen Cerstvik
ATTORNEY.

Nov. 16, 1937.　　　C. L. SEWARD, JR　　　2,099,375
ANTIVIBRATION SUPPORT FOR INSTRUMENTS
Filed May 7, 1935　　　3 Sheets-Sheet 2
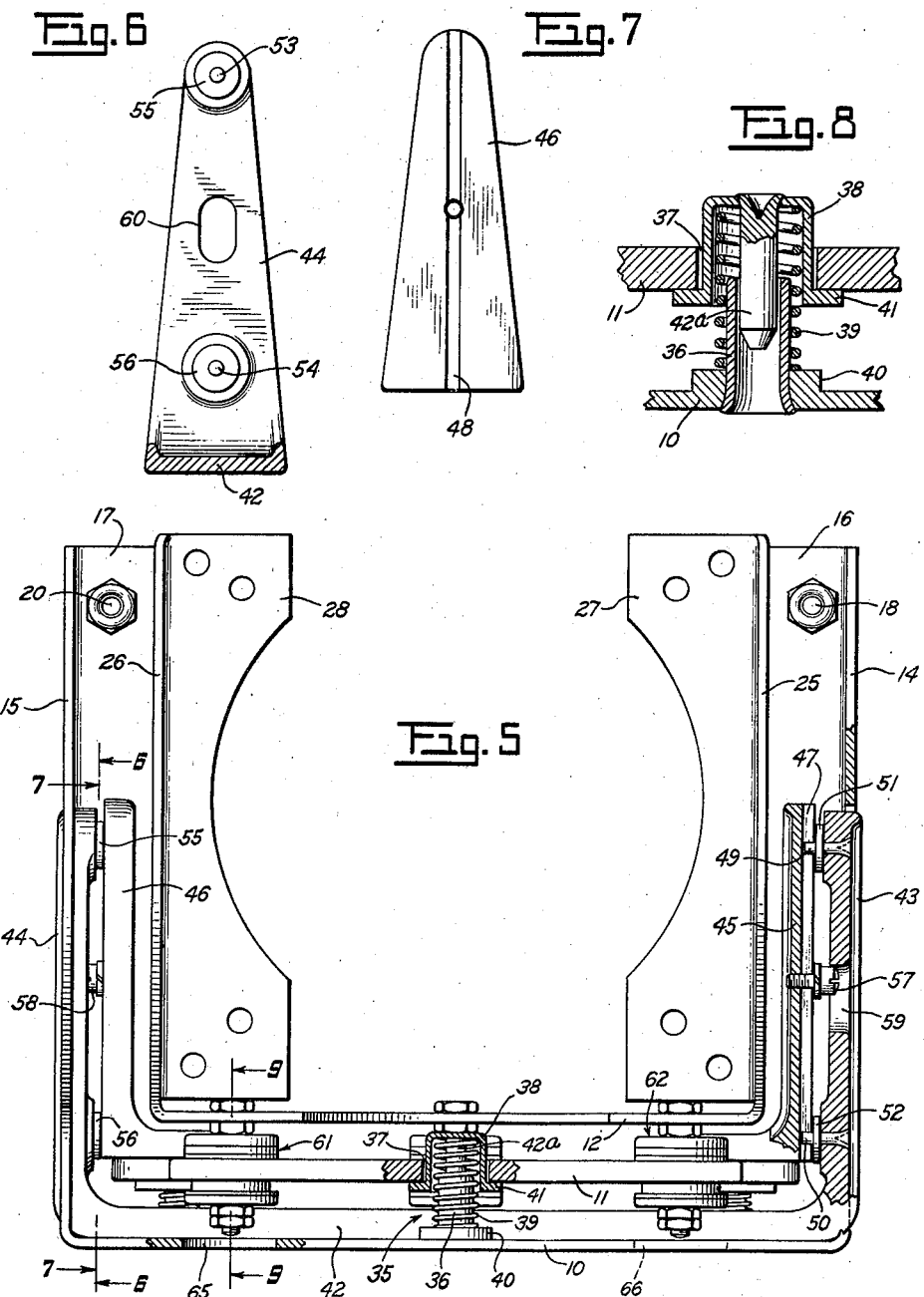
INVENTOR.
Clarence Lee Seward, Jr.
BY Stephen Cerstvik
ATTORNEY.

Nov. 16, 1937.  C. L. SEWARD, JR  2,099,375
ANTIVIBRATION SUPPORT FOR INSTRUMENTS
Filed May 7, 1935  3 Sheets-Sheet 3
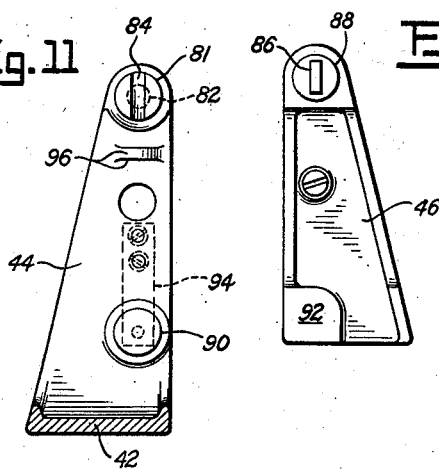
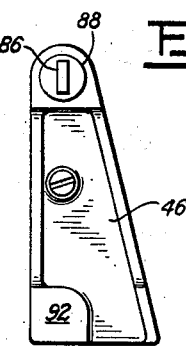
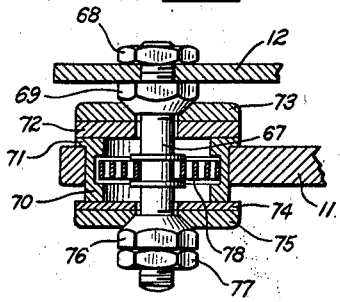
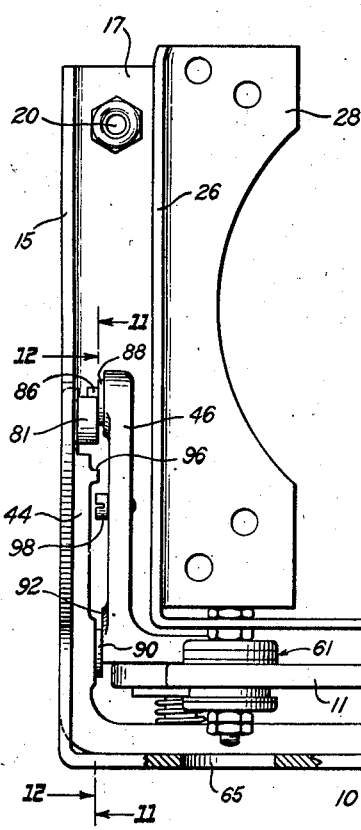
INVENTOR.
Clarence Lee Seward, Jr.
BY Stephen Cerstvik
ATTORNEY.

Patented Nov. 16, 1937

2,099,375

UNITED STATES PATENT OFFICE 2,099,375

ANTIVIBRATION SUPPORT FOR INSTRUMENTS

Clarence Lee Seward, Jr., Washington, D. C., assignor to Bendix Aviation Corporation, South Bend, Ind., a corporation of Delaware Application May 7, 1935, Serial No. 20,237

6 Claims. (Cl. 248—358)

The present invention relates to indicating instruments such, for example, as are adapted for use on aircraft and more particularly to supporting means therefor.

One of the objects of the invention is to provide a novel shock-absorbing or anti-vibration support for an indicating instrument such, for example, as a magnetic compass, whereby vibrations in both the horizontal plane and the vertical plane are substantially prevented from being transmitted from the support to the bowl of the compass especially when the support is mounted on an instrument panel of an aircraft, thus eliminating spinning of the compass card on its pivot. Broadly, however, one of the principal objects is the provision of a novel shock-absorbing or anti-vibration support for any instrument which may be subjected to vibrations whereby vibration of the instrument is substantially prevented both horizontally and vertically.

In accordance with the invention there is provided an anti-vibration or shock-absorbing support constituted by three substantially horizontal supporting members disposed one above the other in parallel planes, one of said members being provided with means for securing an instrument thereto and another one being provided with means for securing it to an instrument panel substantially at right angles thereto. The third member is interposed between said first two members, and vertical yielding means are provided between one of said first two members and the third member for connecting said members together and for absorbing vibrations in a vertical direction. Horizontally yielding means are provided between the other of said first two members and the third member for connecting said members together and for absorbing horizontal vibrations. The two yielding means and the center supporting member thus also constitute an interconnecting yielding structure between the two outer supporting members whereby an instrument carried by one of said outer members may be resiliently connected to an instrument panel by means of the other outer member. Preferably, vertical guiding means are also provided between said one of the first two members and the third member to facilitate relative vertical movement therebetween. The vertical guiding means may also be made to provide a relative rocking movement between the member secured to the panel and the member carrying the instrument, if desired.

A specific object of the invention is to provide a novel shock-absorbing structure for mounting an indicating instrument on an instrument panel and embodying a frame constituted by three substantially horizontal and parallel plates disposed one above the other, one of which is provided with means for securing an instrument thereto and another of which is provided with means for securing it to the instrument panel so as to project therefrom substantially at right angles thereto, the third plate being interposed between said first two plates and having two sets of openings therein, yielding means interposed between one of the first two plates and the third plate for preventing transmission of vertical vibrations from the instrument panel to the instrument and comprising a plurality of pins carried by said one of the first two plates and projecting toward a respective opening of one of the sets in said third plate, a cup-shaped member in each of the openings toward which said pins project and adapted to receive said pins upon relative vertical movement between the third plate and said one of the first two plates, said cup-shaped members having flanges at their open ends to provide an abutment therefor against said third plate, a compression coil spring encircling each pin and projecting into the associated cup-shaped member whereby yielding relative movement may take place in a vertical direction between said third plate and said one of the first two plates, and a second yielding means interposed between said third plate and the other of the first two plates for preventing transmission of horizontal vibrations from the instrument panel to the instrument, said last-named yielding means comprising a plurality of pins carried by the other of the first two plates and projecting through a respective opening of the other set in said third plate, springs interposed between said pins in said other openings and said third plate, and a bearing washer disposed about each of said other openings on that side of said third plate on which the weight of the instrument is exerted and providing bearing surfaces between said third plate and the other of said first two plates to permit and facilitate relative sliding movement in a horizontal plane between said third plate and the other of said first two plates in opposition to the lateral compression force of said springs.

The above and other objects and advantages of the invention will appear more fully hereinafter from a consideration of the detailed description which follows, taken together with the accompanying drawings wherein one embodiment of the invention is illustrated. It is to be expressly understood, however, that the drawings are for the purpose of illustration and description only and are not designed as a definition of the limits of the invention, reference being had for this purpose to the appended claims.

The invention consists substantially in the construction, combination, location and relative arrangement of parts for obtaining the results desired in accordance with the foregoing objects, as will be more fully hereinafter set forth in the specification, as shown in the drawings by way of example, and as finally pointed out in the claims.

In the drawings wherein like reference characters refer to like parts throughout the several views, Fig. 1 is a front view, in elevation, of one form of novel shock-absorbing support embodying the invention and having a magnetic compass mounted thereon by way of example;

Fig. 5 is a substantially full-size rear view, partly in section, of the support with the compass removed;

Fig. 6 is a section taken on line 6—6 of Fig. 5;

Fig. 7 is a similar section taken on line 7—7 of Fig. 5;

Fig. 8 is an enlarged detail section taken on line 8—8 of Fig. 4, showing one of the vertical shock-absorbing elements;

Fig. 9 is an enlarged detail section taken on line 9—9 of Fig. 5, showing one of the horizontal shock-absorbing elements;

Fig. 10 is a full-size rear view of another form of anti-vibration support embodying the invention whereby relative rocking movement may take place between the instrument and its support;

Fig. 11 is a section taken on line 11—11 of Fig. 10; and

Fig. 12 is a similar section taken on line 12—12 of Fig. 10.

Figures 1, 2:
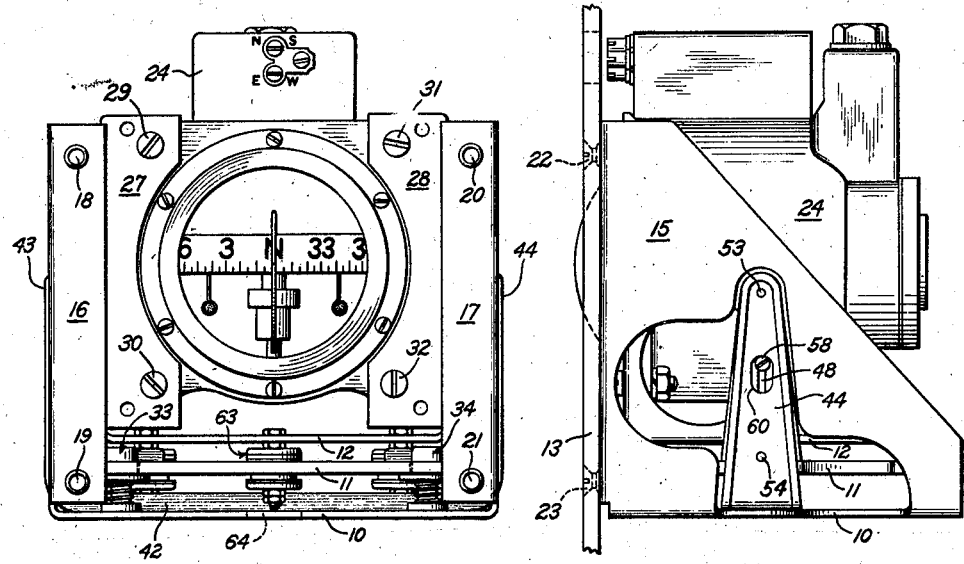
Fig. 2 is a side elevation of the structure shown in Fig. 1 as viewed from the left and mounted on an instrument panel.
Figures 3, 4:
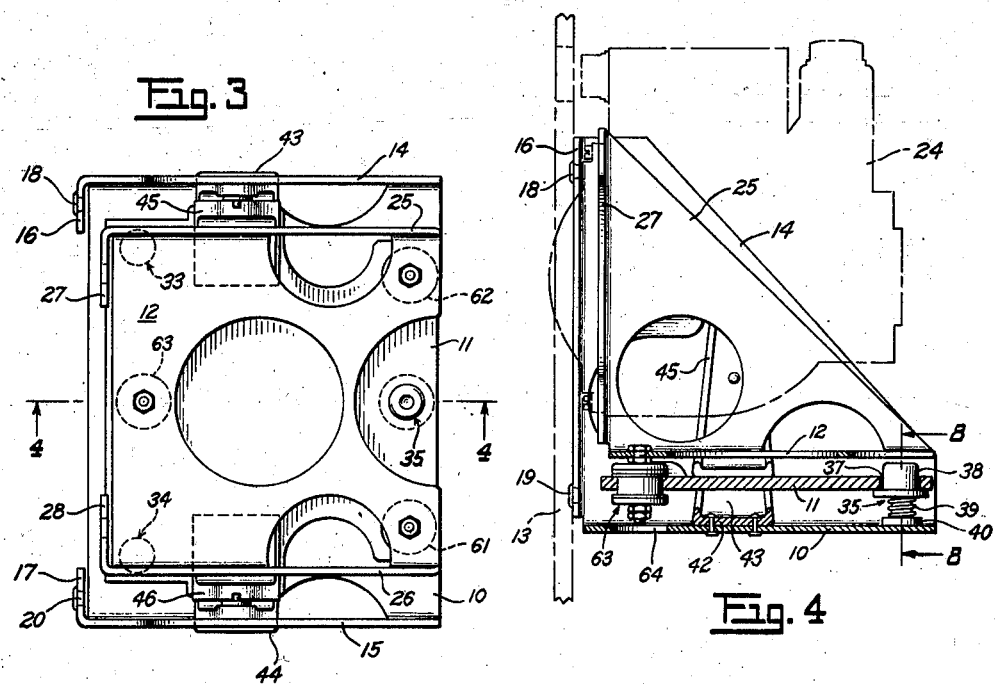
Fig. 3 is a top plan view of Fig. 2 with the compass and panel removed.
Fig. 4 is a section taken on line 4—4 of Fig. 3 with the compass and panel shown in dotted lines.

Referring now to the drawings, and more particularly to Figs. 1 to 9, inclusive, the novel shock-absorbing or anti-vibration support of the invention comprises, in the form shown, three horizontal and parallel plates 10, 11 and 12 disposed one above the other and, in the present instance, the plate 10 constitutes the bottom plate and the plate 12 constitutes the uppermost plate, with plate 11 interposed between said plates 10 and 12. The bottom plate 10 is provided with means for securing it to a fixed support such, for example, as an instrument panel 13 (Fig. 2) of an aircraft, and, as illustrated, said means are constituted by upwardly extending triangular walls 14 and 15 disposed on opposite sides of the plate 10 and formed integrally therewith, said walls having portions 16 and 17 bent inwardly at right angles and towards each other (Figs. 1 and 3). Bent in portion 16 is provided with tapped holes 18 and 19 and the bent in portion 17 is provided with a similar pair of tapped holes 20 and 21 for receiving screws, two of which are shown at 22 and 23 (Fig. 2), and by means of which said plate 10 is secured to the instrument panel 13 so as to project therefrom at substantially right angles thereto.

The uppermost plate 12 is provided with means for securing an instrument thereto such, for example, as a magnetic compass 24, said means being similar to those of the lower plate 10 and constituted by upwardly extending triangular walls 25 and 26 having right-angularly bent-in portions 27 and 28, each having a pair of countersunk holes for receiving screws 29, 30, 31 and 32 (Fig. 1) by means of which the instrument 24 is secured to said plate 12.

The plates 10, 11 and 12 are resiliently interconnected in a manner and for a purpose which will appear hereinafter.

Means are now provided for preventing the transmission of vertical vibrations to the instrument 24 from the panel 13 when the plate 10 is secured thereto, said means comprising three vertical shock absorbers triangularly spaced between the plate 10 and plate 11. Two of said vertical shock absorbers are shown at 33 and 34 in Fig. 1, and the third is shown at 35 in Fig. 4. The first two, namely, 33 and 34, are located substantially in the front corners of the center plate 11 while the third one, namely, 35 is located substantially centrally of the rear edge of said center plate 11, the triangular arrangement of said shock absorbers 33, 34 and 35 being readily perceived from the top plan view shown in Fig. 3.

All three of said shock-absorbing members 33, 34 and 35 are identical in structure and an enlarged detailed section of one of them is shown in Fig. 8. From the latter figure it will be seen that each of said vertical shock absorbers comprises a pin 36 carried by the lower plate 10 and projecting upwardly toward an opening 37 provided in the center plate 11. A cup-shaped member 38 is provided in the opening 37 with its open end disposed toward the pin 36 so as to receive the pin 36 upon relative vertical movement between the plates 10 and 11. A coil spring 39 is provided about the pin 36 and has one end thereof projecting into and abutting against the closed end of the cup-shaped member 38, and its other end abutting against a boss 40 formed integrally with the plate 10 about the pin 36. The spring 39 is a compression spring and normally maintains the cup-shaped member 38 in the opening 37, as shown in Fig. 8, and the cup-shaped member is provided with a peripheral flange 41 at the open end thereof to provide an abutment therefor against said plate 11, thereby preventing said cup-shaped member from being dislodged from its opening 37. The pin, in the embodiment shown in Fig. 8, is in the form of a tubular member in order that it may receive in telescopic engagement therewith a guide pin 42a secured to the closed or upper end of the cup-shaped member 38 whereby the cup-shaped member and, hence, the plates 10 and 11 are guided in a vertical direction upon vertical relative movement between said plates. The pin 36, however, may be a solid pin 36a (Fig. 10) and the guide pin 42a may then be eliminated so that there may be obtained a slight relative rocking movement between the plates 10 and 11 about said pin 36a, if desired, as will appear later in connection with the embodiment shown in Fig. 10, the main object of the invention being the provision of a plurality of such pins as 36, either tubular or solid, on the plate 10 and projecting toward a respective opening 37 in the center plate 11, a cup-shaped member such as 38 in each of said openings and adapted to receive the pin 36 upon relative vertical movement between the plates 10 and 11, and a compression coil spring encircling the pin 36 and projecting into the cup-shaped member 38 whereby yielding relative movement may take place in a vertical direction between the plates 10 and 11. By virtue of the triangular spaced relation of the shock-absorbing members 33, 34 and 35 the plates 10 and 11 are maintained substantially parallel at all times, the plate 11 being supported on the plate 10 by means of the coil springs 39 against the force of which the relative vertical movement takes place.

Additional guide means are provided for further guiding the plates 10 and 11 in a vertical direction upon vertical relative movement between said plates and, in the form shown in Figs. 2, 5, 6 and 7, said means comprise a pair of oppositely disposed vertical upwardly tapering arms 43 and 44 carried by the plate 10 and projecting upwardly therefrom at the side edges thereof in substantially the same plane with the side walls 14 and 15, the latter being cut away, as shown in Fig. 2, to accommodate said arms. The arms may be separate members or formed out of a single member 42 (Fig. 5) bent upwardly at its end to provide said arms 43 and 44. In the present instance, the arms 43 and 44 are secured to the plate 10 by riveting the member 42 to said plate 10, as shown in section in Fig. 4.

Another pair of oppositely disposed vertical upwardly tapering arms 45 and 46 are provided which are carried by the center plate 11 and which project upwardly therefrom at the side edges thereof, as shown in Fig. 5. The arm 45 is disposed adjacent the arm 43 while the arm 46 is disposed adjacent the arm 44 for cooperation therewith as will now appear.

The arms 45 and 46 are each provided with a slot or groove extending longitudinally thereof, the slot of arm 45 being shown at 47 (Fig. 5) and that of the arm 46 being shown at 48 (Fig. 7). Adapted to slide within the slot or groove 47 are a pair of pins 49 and 50 carried by the arm 43 and projecting therefrom at right angles thereto into the slot 47, as shown in Fig. 5, the pin 49 being at the upper end of said arm 43 and the pin 50 being at the lower end thereof. Secured to or formed integrally with the pins 49 and 50 are a pair of discs 51 and 52, respectively, through which said pins 49 and 50 project and the surfaces of which are polished in order to provide smooth bearing surfaces which cooperate with the face of the arm 45. A corresponding pair of pins 53 and 54 are provided on the upper and lower end of the arm 44 for sliding movement in slot or groove 48 of the arm 46 (Figs. 6 and 7), said pins 53 and 54 being likewise provided with corresponding discs 55 and 56 for cooperation with the face of the arm 46.

Thus, it will be seen that the pins 49, 50 and 53, 54 are adapted to slide within their respective grooves 47 and 48 and thereby guide the plates 10 and 11 upon vertical relative movement therebetween. In order to prevent the pins 49 and 53 from sliding completely out of their respective grooves 47 and 48 stops are provided on the arms 45 and 46 and, in the form shown, said stops are constituted by screws 57 and 58 which are rigidly secured to said arms 45 and 46 and project therefrom into elongated openings provided in the cooperating arms 43 and 44, respectively, the opening in arm 43 being shown at 59 in Fig. 5 and the opening in arm 44 being shown at 60 in Fig. 6. Accordingly, the vertical relative movement between the plates 10 and 11 is limited to the size of the elongated openings 59 and 60.

Means are now provided for preventing the transmission of horizontal vibrations to the instrument 24 from the panel 13 when the plate 10 is secured thereto and, in the present instance said means comprise three shock-absorbing elements of the type shown in Patent No. 1,983,103, dated December 4, 1934, assigned to the same assignee as the present invention, said elements being triangularly spaced between the plates 11 and 12 whereby relative horizontal movement may take place between said plates 11 and 12 without, however, any vertical relative movement therebetween. Two of said horizontally acting shock-absorbing elements are shown at 61 and 62 in Fig. 5 and the third is shown at 63 in Fig. 1. The first two, namely, 61 and 62 are located substantially in the rear corners of the center plate 11, while the third one, namely, 63 is located substantially centrally of the front edge of said center plate, the triangular arrangement of said elements being readily perceived from the top plan view shown in Fig. 3.

In order to prevent said shock-absorbing members 61, 62 and 63 from striking the lower plate 10 upon relative vertical movement between said plate 10 and the plate 11, the former is provided with a circular opening under each of said shock-absorbing elements, one of said openings being shown at 64 in Fig. 4, which cooperates with the shock-absorbing member 63. The other two openings for the members 61 and 62 are shown at 65 and 66, respectively, in Fig. 5.

All three of said horizontally acting shock-absorbing members 61, 62 and 63 are identical in structure and an enlarged detail section of one of them is shown in Fig. 9. From this figure, it will be seen that each of the horizontally acting shock-absorbers comprises a pin 67 carried by and secured to the plate 12 in any suitable manner as by means of a nut 68 disposed on one side of the plate 12 and another nut 69 disposed on the other side of said plate. The pin 67 is arranged to project into and extend through a housing or collar 70 rigidly secured, as by means of a press fit, in an opening in the center plate 11, said housing or collar 70 being of some suitable metal such, for example, as phosphor-bronze or stellite and being provided with an annular flange 71 at the upper end thereof so as to present a bearing surface which is adapted to cooperate with a similar bearing surface provided by a washer 72 which is also of phosphor-bronze or stellite. The washer is disposed about the pin 67 and held in engagement with the bearing surface of the collar 71 by means of a lock washer 73. Another washer 74 which is like washer 72 is provided at the lower end of the housing 70 and forms a bearing surface which cooperates with the lower periphery of said housing 70 and is held in engagement therewith by a lock washer 75, a lock nut 76 and a retaining nut 77. Thus, it will be seen that upon relative movement between plates 11 and 12 in any direction parallel to said plates a sliding movement will take place between washers 72, 74 and the cooperating surfaces provided at the ends of the housing 70. Within the housing 70 is a flat coil spring 78 having one end connected to the pin 67 and its other end to the inner wall of the housing 70 so that upon relative sliding movement between the plates 11 and 12, the spring 78 functions to oppose such movement and thereby provides a resilient connection between said plates by means of which any horizontal vibrations of the plate 11 are prevented from being transmitted to the plate 12.

In operation, if the supporting plate 10 is secured to an instrument panel on an airplane by means of the portions 16 and 17 of the side walls 14 and 15 of said plate 10, the latter will be subject to vibrations which are generally produced by the internal combustion engine or engines operating the plane and by forces acting on the plane in maintaining it in flight, said vibrations acting in all directions but may be resolved into horizontal and vertical components. If an instrument be secured to the plate 12 by means of the portions 27 and 28 of the side walls 25 and 26, the vertical component of vibrations will be prevented from being transmitted to said instrument by virtue of the fact that vertical relative movement will take place between the plates 10 and 11 against the springs 39 of the vertical shock-absorbing elements 33, 34 and 35, respectively, there being no relative vertical movement between the plates 11 and 12. The horizontal component of vibrations will be prevented from being transmitted from the plate 10 to the plate 12 by virtue of the fact that relative horizontal movement takes place between the plates 11 and 12 against the force of the flat coil spring 78 of the horizontal shock-aborbing members 61, 62 and 63, there being no relative horizontal movement between the plates 10 and 11. As previously pointed out, the vertical relative movement between plates 10 and 11 and, hence, between plates 10 and 12 is guided by means of the guide arms 43, 45 and 44, 46 and also by means of the guide pins 42a of the respective vertical shock-absorbing members 33, 34 and 35. Thus, all vibrations acting on the plate 10 are prevented from being transmitted to the instrument carried by the plate 12.

Referring now to Figs. 10, 11 and 12, there is illustrated another embodiment of the invention wherein the guide pins 42a are eliminated in the vertical shock-absorbing members 33, 34 and 35 and the guide arms 43, 45 and 44, 46 are so constructed and arranged that pivotal rocking movement may take place between the plates 10 and 11 in a direction perpendicular to the plane of the paper as viewed in Fig. 10, and about a horizontal axis passing through the upper ends of the guide arms 43 and 44. In this embodiment of the invention and for the purpose stated the guide arm 43 is provided at its upper end with a flat disc-like member 79 which is journaled for rotary movement in said guide arm 43 by means of a projection 80 secured to or formed integrally with the disc member 79. The arm 44 on the opposite side of the plate 10 is provided with a corresponding disc-like member 81 which is journaled in said arm 44 by means of a projection 82 (Fig. 11). The disc-like members 79 and 81 are provided with vertical slots 83 (Fig. 10) and 84 (Fig. 11), respectively. Arranged to cooperate with the slots 83 and 84 there are provided tongues 85 and 86 formed integrally with disc-like members 87 and 88 carried by the upper ends of the guide arms 45 and 46. Upon relative vertical movement between the plates 10 and 11 the tongues 85 and 86 slide longitudinally within their respective slots 83 and 84 and the cooperating surfaces of the disc-like members 79, 87 and 81, 88 provide bearing surfaces to facilitate such sliding movement and, therefore, said surfaces are given a high polish. Since, however, the disc-like members 79 and 81 are arranged for rotary movement within their respective guide arms 43 and 44, a pivotal movement may take place between the plates 10 and 11 in a direction perpendicular to the plane of the paper, as viewed in Fig. 10, and about an axis passing through the centers of the disc-like members 79 and 81. Such pivotal movement may take place independently of or simultaneously with the vertical relative movement. In order to facilitate the pivotal movement, a friction disc 89 is provided at the lower end of the arm 43 and a corresponding friction disc 90 is provided at the lower end of the arm 44, said discs being more or less loosely mounted in said arms by means of suitable pins formed integrally with said discs. The friction discs 89 and 90 are arranged to cooperate with friction surfaces 91 and 92 provided at the lower ends of the guide arms 45 and 46, respectively, and in order to maintain said friction discs 89 and 90 in engagement with their cooperating friction surfaces 91 and 92, means are provided in the form of leaf springs 93 and 94 secured to the outer walls of the guide arms 43 and 44, respectively. The springs 93 and 94 bear against the ends of the pins of the friction discs 89 and 90, respectively, as shown in Figs. 10 and 11.

In order to limit the vertical relative movement between the plates 10 and 11 the guide arms 43 and 44 are provided with transversely extending projections 95 and 96, respectively, which cooperate with stop screws 97 and 98 carried by the guide arms 45 and 46.

A slight rocking movement may also take place in a direction in the plane of the paper by virtue of the fact that guide tongues 85 and 86 work loosely in their cooperating slots 83 and 84 and if the right-hand end of the plate 11, as viewed in Fig. 10, be lowered or the corresponding end of the plate 10 be raised, the top part of tongue 86 will recede from the slot 84 and its lower part will move farther into slot 84 while the upper part of tongue 85 will move farther into the slot 83 and its lower part will recede from slot 83. At this time the leaf spring 93 on the arm 43 will urge the friction disc 89 toward the friction surface 91 which has been slightly moved away from said disc in a direction toward the left as viewed in Fig. 10 due to the rocking movement.

The above-mentioned pivotal and rocking movements between the plates 10 and 11 are permitted because the guide pins 42a of the vertical shock-absorbing members 43, 44 and 45 have been eliminated and, therefore, the vertical coil springs 39 of said members act to oppose these movements and, hence, provide a resilient shock-absorbing action not only in the vertical direction but in two mutually perpendicular horizontal directions when the pivotal and rocking movements take place. Consequently, with the embodiment of the invention shown in Figs. 10, 11 and 12 transmission of vibrations to an instrument carried by the plate 12 are prevented to a somewhat greater extent than in the embodiment shown in Figs. 1 to 7, inclusive, but both embodiments provide substantial elimination of vibrations of the instrument vertically and horizontally.

There is thus provided a novel shock-absorbing or anti-vibration support for an indicating instrument whereby vibrations in both the horizontal plane and the vertical plane are substantially prevented from being transmitted from the support to the instrument and particularly when the support is mounted on an instrument panel of an aircraft. If a compass be mounted on the support the magnetic card of the compass will be prevented from spinning on its pivot thereby providing accurate indications of compass direction and facilitating reading of the card because the graduations on the card do not become blurred as they otherwise do when the vibrations are not eliminated.

Although only two embodiments of the invention have been illustrated and described, various changes and modifications in the form and relative arrangement of the parts, which will now appear to those skilled in the art, may be made without departing from the scope of the invention. For example, the supports shown in Figs. 5 and 10 might be mounted on the instrument panel in an inverted position so that the instrument may be suspended from said support instead of being carried thereon, the broad feature of the invention being the relative arrangement, connection and cooperation of the plates 10, 11 and 12. Reference is, therefore, to be had to the appended claims for a definition of the limits of the invention.

What is claimed is:

1. An anti-vibration support for mounting an indicating instrument on a fixed support, comprising a frame constituted by three substantially horizontal and parallel plates disposed one above the other, one of which is provided with means for securing an instrument thereto and another of which is provided with means for securing it to the fixed support, the third plate being interposed between said first two plates and having two sets of openings therein, yielding means interposed between one of the first two plates and the third plate for preventing transmission of vertical vibrations from the fixed support to the instrument and comprising a plurality of pins carried by said one of the first two plates and projecting toward a respective opening of one of the sets in said third plate, a cup-shaped member in each of the openings toward which said pins project and adapted to receive said pins upon relative movement between the third plate and said one of the first two plates, said cup-shaped members having flanges at their open ends to provide an abutment therefor against said third plate, a vertically extending compression coil spring encircling each pin and projecting into the associated cup-shaped member whereby yielding relative movement may take place in a vertical direction between said third plate and said one of the first two plates, and second yielding means interposed between said third plate and the other of the first two plates for preventing transmission of horizontal vibrations from the fixed support to the instrument, said last-named yielding means comprising a plurality of pins carried by the other of the first two plates and projecting through a respective opening of the other set in said third plate, a flat coil spring interposed between each of said pins in said other openings and said third plate, and a bearing washer disposed about each of said pins and their respective openings and on that side of said third plate on which the weight of the instrument is exerted and providing bearing surfaces between said third plate and the other of said first two plates to permit and facilitate relative sliding movement in a horizontal plane between said third plate and the other of said first two plates in opposition to the lateral compression force of said flat coil springs.

2. An anti-vibration support for mounting an indicating instrument on a fixed support, comprising a frame constituted by three substantially horizontal and parallel plates disposed one above the other, one of which is provided with means for securing an instrument thereto and another of which is provided with means for securing it to the fixed support, the third plate being interposed between said first two plates and having two sets of openings therein, yielding means interposed between one of the first two plates and the third plate for preventing transmission of vertical vibrations from the fixed support to the instrument and comprising a plurality of pins carried by said one of the first two plates and projecting toward a respective opening of one of the sets in said third plate, a cup-shaped member in each of the openings toward which said pins project and adapted to receive said pins upon relative movement between the third plate and said one of the first two plates, said cup-shaped members having flanges at their open ends to provide an abutment therefor against said third plate, a vertically extending compression coil spring encircling each pin and projecting into the associated cup-shaped member whereby yielding relative movement may take place in a vertical direction between said third plate and said one of the first two plates, second yielding means interposed between said third plate and the other of the first two plates for preventing transmission of horizontal vibrations from the fixed support to the instrument, said last-named yielding means comprising a plurality of pins carried by the other of the first two plates and projecting through a respective opening of the other set in said third plate, a flat coil spring interposed between each of said pins in said other openings and said third plate, and a bearing washer disposed about each of said pins and their respective openings and on that side of said third plate on which the weight of the instrument is exerted and providing bearing surfaces between said third plate and the other of said first two plates to permit and facilitate relative sliding movement in a horizontal plane between said third plate and the other of said first two plates in opposition to the lateral compression force of said flat coil springs, and guiding means between said one of the first two plates and the third plate to facilitate relative vertical movement therebetween.

3. An anti-vibration support for mounting an indicating instrument on a fixed support, comprising a frame constituted by three substantially horizontal and parallel plates disposed one above the other, one of which is provided with means for securing an instrument thereto and another of which is provided with means for securing it to the fixed support, the third plate being interposed between said first two plates and having two sets of openings therein, yielding means interposed between one of the first two plates and the third plate for preventing transmission of vertical vibrations from the fixed support to the instrument and comprising a plurality of pins carried by said one of the first two plates and projecting toward a respective opening of one of the sets in said third plate, a cup-shaped member in each of the openings toward which said pins project and adapted to receive said pins upon relative movement between the third plate and said one of the first two plates, said cup-shaped members having flanges at their open ends to provide an abutment therefor against said third plate, a vertically extending compression coil spring encircling each pin and projecting into the associated cup-shaped member whereby yielding relative movement may take place in a vertical direction between said third plate and said one of the first two plates, second yielding means interposed between said third plate and the other of the first two plates for preventing transmission of horizontal vibrations from the fixed support to the instrument, said last-named yielding means comprising a plurality of pins carried by the other of the first two plates and projecting through a respective opening of the other set in said third plate, a flat coil spring interposed between each of said pins in said other openings and said third plate, and a bearing washer disposed about each of said pins and their respective openings and on that side of said third plate on which the weight of the instrument is exerted and providing bearing surfaces between said third plate and the other of said first two plates to permit and facilitate relative sliding movement in a horizontal plane between said third plate and the other of said first two plates in opposition to the lateral compression force of said flat coil springs, and guiding means between said one of the first two plates and the third plate to facilitate relative vertical movement therebetween, said guiding means including means providing rocking movement between said one of the first two plates and the third plate in a horizontal direction.

4. An anti-vibration support comprising three substantially horizontal supporting members disposed one above the other in parallel planes, one of said members being provided with means for securing thereto a device which is to be prevented from vibrating and another one of said members being provided with means for securing it to a fixed support susceptible to vibration, the third member being interposed between said first two members, vertically yielding means between one of said first two members and the third member for absorbing vibrations in a vertical direction, and horizontally yielding means between the other of said first two members and the third member for absorbing vibrations in a horizontal direction and slidable means cooperating with said horizontally yielding means for facilitating relative horizontal movement.

5. An anti-vibration support comprising three substantially horizontal supporting members disposed one above the other in parallel planes, one of said members being provided with means for securing thereto a device which is to be prevented from vibrating and another one of said members being provided with means for securing it to a fixed support susceptible to vibration, the third member being interposed between said first two members, vertically yielding means between one of said first two members and the third member for absorbing vibrations in a vertical direction, horizontally yielding means between the other of said first two members and the third member for absorbing vibrations in a horizontal direction, and guiding means between said one of the first two members and said third member for facilitating vertical relative movement therebetween.

6. An anti-vibration support comprising three substantially horizontal supporting members disposed one above the other in parallel planes, one of said members being provided with means for securing thereto a device which is to be prevented from vibrating and another one of said members being provided with means for securing it to a fixed support susceptible to vibration, the third member being interposed between said first two members, vertically yielding means between one of said first two members and the third member for absorbing vibrations in a vertical direction, horizontally yielding means between the other of said first two members and the third member for absorbing vibrations in a horizontal direction, and guiding means between said one of the first two members and said third member for facilitating vertical relative movement therebetween, said guiding means including means providing rocking movement between said one of the first two members and the third member about a horizontal axis.

CLARENCE LEE SEWARD, Jr.